United States Patent
Kobayashi et al.

(10) Patent No.: US 8,529,360 B2
(45) Date of Patent: Sep. 10, 2013

(54) OUTER JOINT MEMBER FOR FIXED CONSTANT VELOCITY UNIVERSAL JOINT

(75) Inventors: Masazumi Kobayashi, Iwata (JP); Kisao Yamazaki, Iwata (JP); Minoru Ishijima, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/143,761

(22) PCT Filed: Dec. 18, 2009

(86) PCT No.: PCT/JP2009/071088
§ 371 (c)(1),
(2), (4) Date: Jul. 8, 2011

(87) PCT Pub. No.: WO2010/082427
PCT Pub. Date: Jul. 22, 2010

(65) Prior Publication Data
US 2011/0269556 A1 Nov. 3, 2011

(30) Foreign Application Priority Data

Jan. 14, 2009 (JP) ................................. 2009-005842

(51) Int. Cl.
*F16D 3/224* (2011.01)
*C21D 7/02* (2006.01)

(52) U.S. Cl.
USPC ............................................ 464/145; 72/714

(58) Field of Classification Search
USPC .................................... 464/145, 906; 72/714
See application file for complete search history.

(56) References Cited

U.S. PATENT DOCUMENTS

| 5,509,857 | A | * | 4/1996 | Flaugher | 464/145 |
| 6,120,382 | A | * | 9/2000 | Sone et al. | 464/145 |
| 6,132,316 | A | * | 10/2000 | Statham | 464/145 |
| 6,190,262 | B1 | * | 2/2001 | Miyazaki | 464/145 X |
| 6,224,490 | B1 | * | 5/2001 | Iihara et al. | 464/145 |
| 7,175,531 | B2 | * | 2/2007 | Schaaf et al. | 464/145 |

(Continued)

FOREIGN PATENT DOCUMENTS

| EP | 2 042 764 | 4/2009 |
| EP | 2 119 931 | 11/2009 |

(Continued)

OTHER PUBLICATIONS

AE-07 Universal Joint and Driveshaft Design Manual, Society of Automotive Engineers, 1979. p. 165. TJ1059.S62 1979.*

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

An outer joint member for a fixed type constant velocity universal joint contributes to the reduction of the number of man-hours through the reduction of the number of processes after a forging process, to an increase in yield, and to the reduction of manufacturing cost. The outer joint member is made of machine-structural carbon steel. The portions of the outer joint member that are finished by cold forging are track grooves, radially inner spherical-surface portions, a cup-inlet chamfer, track chamfers, track-inlet chamfers, a part except for a boot fixing portion on a radially outer surface of the cup section, and a center hole at an end surface of the shaft section.

12 Claims, 12 Drawing Sheets

(56) References Cited

U.S. PATENT DOCUMENTS

| | | | |
|---|---|---|---|
| 7,914,382 B2 * | 3/2011 | Sakaguchi et al. | 464/906 X |
| 8,162,765 B2 * | 4/2012 | Sone et al. | 464/145 |
| 2004/0254022 A1 * | 12/2004 | Kuczera et al. | 464/145 |
| 2009/0013746 A1 | 1/2009 | Ishizuna et al. | |
| 2010/0087261 A1 | 4/2010 | Kura et al. | |
| 2010/0234115 A1 | 9/2010 | Yoshida et al. | |
| 2011/0059804 A1 * | 3/2011 | Yamazaki et al. | 464/145 |
| 2011/0212788 A1 * | 9/2011 | Kobayashi et al. | 464/145 |

FOREIGN PATENT DOCUMENTS

| | | |
|---|---|---|
| JP | 3-112125 | 11/1991 |
| JP | 2000-230570 | 8/2000 |
| JP | 2002-346688 | 12/2002 |
| JP | 2008-111469 | 5/2008 |
| JP | 2008-121791 | 5/2008 |
| WO | WO 2007049512 A1 * | 5/2007 |
| WO | 2007/097141 | 8/2007 |
| WO | 2007/148487 | 12/2007 |
| WO | 2008/010340 | 1/2008 |
| WO | WO 2008072521 A1 * | 6/2008 |
| WO | 2008/099678 | 8/2008 |

OTHER PUBLICATIONS

Cardarelli, F. Materials Handbook: A Concise Desktop Reference, 2nd ed. London, Springer-Verlag London Limited, 2008. p. 85.*

International Preliminary Report on Patentability and Written Opinion of the International Searching Authority issued Aug. 25, 2011 in International (PCT) Application No. PCT/JP2009/071088.

International Search Report issued Feb. 16, 2010 in International (PCT) Application No. PCT/JP2009/071088.

* cited by examiner

OUTER JOINT MEMBER FOR FIXED CONSTANT VELOCITY UNIVERSAL JOINT

TECHNICAL FIELD

The present invention relates to an outer joint member for a fixed type constant velocity universal joint.

BACKGROUND ART

Examples of constant velocity universal joints include a fixed type constant velocity universal joint which allows only angular displacement and a plunging type constant velocity universal joint which allows not only the angular displacement but also axial displacement. Examples of the fixed type constant velocity universal joint include a Birfield type (BJ) and an undercut free type (UJ), and examples of the plunging type constant velocity universal joint include a double offset type constant velocity universal joint (DOJ) and a cross groove type constant velocity universal joint (LJ).

The fixed type constant velocity universal joint of the BJ type includes an outer race as an outer joint member having an inner spherical surface equiangularly provided with a plurality of track grooves formed along an axial direction, an inner race as an inner joint member having an outer spherical surface equiangularly provided with a plurality of track grooves formed along the axial direction in pairs with the track grooves of the outer race, a plurality of balls interposed between the track grooves of the outer race and the track grooves of the inner race so as to transmit torque, and a cage interposed between the inner spherical surface of the outer race and the outer spherical surface of the inner race so as to hold the balls. The cage includes a plurality of window portions arranged along a circumferential direction and housing the balls.

In constant velocity universal joints for automobiles, for the purpose of securing rigidity, machine-structural carbon steel higher in carbon content than case-hardening steel is used as a material for the outer race (outer joint member). The machine-structural carbon steel of the outer joint member used for the constant velocity universal joints is a hard material, and hence difficult to undergo cold forging. Conversely, in the cold forging in which processes are performed in a glasshouse or the like, deformability of a material is markedly lowered in comparison with hot forging, and deformation resistance becomes markedly higher. Thus, materials to be forged are limited. The deformation resistance means stress required for deformation of the materials. When the deformation resistance is high, a processing force becomes higher, and hence stress acting on a die becomes higher. Thus, abrasion, deformation, and breakage of the die are liable to occur. Further, the deformability means such a property as to be deformed without breakage, and is evaluated based on a limit of crack occurrence at the time of a forging process, that is, a magnitude of a processing rate or distortion By the way, the above-mentioned outer joint member (outer race) is such a component that requires high mechanical accuracy. Thus, conventionally, there has been such a technique that general cold forging is unavailable with respect to the outer al common sense race as a mechanical component, and hence there has been no idea of performing cold forging thereon. Under the circumstance, a raw material obtained by hot forging undergoes a turning process so as to be formed into a shape approximate to a product shape, and then undergoes a grinding process after heat treatment. Products are formed in this manner. Specifically, a radially-inner spherical surface, a cup-inlet chamfer, and track-inlet chamfers undergo a cutting process, and track grooves and the radially-inner spherical surface undergo a grinding process after heat treatment. Thus, conventionally, the cutting process and the grinding process are used in many cases as post processes of a forging process as described above. As a result, man-hours of the post processes are increased, which leads to an increase in manufacturing cost.

Thus, in recent years, there has been proposed adoption of cold forging so that the number of machining steps is reduced (Patent Literature 1).

Citation List

Patent Literature 1: JP 2002-346688 A

SUMMARY OF INVENTION

Technical Problems

However, even when cold forging is adopted, normally, improvement is made under such a technical common sense that cold forging is not available. Thus, cold forging is performed only on parts that are easy to process, that is, performed only on a part of the outer race. Meanwhile, according to a method of manufacturing an outer race described in Patent Literature 1 above, cold forging is performed on a large part of the outer race.

However, although Patent Literature 1 describes that parts of the outer race are molded by cold forging, there is no description that the outer race is finished by the cold forging. Thus, in the method of manufacturing an outer race described in Patent Literature 1, it is necessary to perform a finishing process on the parts of the outer race after cold forging.

In view of the above-mentioned problems, the present invention has been made to provide an outer joint member for a fixed type constant velocity universal joint, the outer joint member contributing to reduction of the number of man-hours through reduction of the number of post processes after a forging process, and to an increase in yield, and reduction of manufacturing cost.

Solution to Problems

An outer joint member for a fixed type constant velocity universal joint according to the present invention is made of machine-structural carbon steel, and includes a cup section, the cup section having a radially inner surface provided with track grooves, radially inner spherical-surface portions, a cup-inlet chamfer formed along an entire opening periphery of the cup section, track chamfers formed along boundary portions between the radially inner spherical-surface portions and the track grooves, and track-inlet chamfers formed at boundary portions between the track grooves and the cup-inlet chamfer. The following portions of the outer joint member are finished by cold forging the track grooves; the radially inner spherical-surface portions; the cup-inlet chamfer; the track chamfers; the track-inlet chamfers; a part except for a boot fixing portion on a radially outer surface of the cup section; and a center hole at an end surface of the shaft section. Here, finishing by cold forging means that it is unnecessary to perform finishing processes such as a cutting process and a grinding process after cold forging.

The outer joint member for a fixed type constant velocity universal joint according to the present invention is made of machine-structural carbon steel, and the following are finished by cold forging: the track grooves; the radially inner spherical-surface portions; the cup-inlet chamfer; the track chamfers; the track-inlet chamfers; the part except for the boot fixing portion on the radially outer surface of the cup section; and the center hole at the end surface of the shaft section. Thus, on those parts, it is unnecessary to perform conventional finishing processes such as a cutting process and a grinding process after cold forging.

The radially inner spherical-surface portions of the cup section may undergo a finishing process after heat treatment because strict accuracy is required for the radially inner spherical-surface portions in some cases. Here, examples of the heat treatment include induction-hardening treatment. Further, examples of the finishing process include a cutting process and a grinding process. The induction hardening is a quenching method in which a part required to be quenched is surrounded by a coil carrying high-frequency current and which applies such a principle as to generate Joule heat by electromagnetic induction so as to heat a conductive body. Note that, according to accuracy required for the radially inner spherical-surface portions, the radially inner spherical-surface portions may be finished only by cold forging.

It is preferred that a slit groove extending in the axial direction be formed in each of the radially inner spherical-surface portions of the cup section, and a width dimension of the slit groove be set to range from 5% to 30% of a maximum width dimension of each of the radially inner spherical-surface portions between the track grooves adjacent to each other in a circumferential direction.

As described above, when the slit groove extending in the axial direction is formed between the track grooves adjacent to each other in the circumferential direction in each of the radially inner spherical-surface portions of the outer joint member, at the time of cold-forging, extruded portions of a raw material of the outer joint member do not intrude into gaps of a molding die for cold-forging. Thus, the radially inner spherical-surface portions can be formed at desired shape accuracy. In particular, when the width dimension of the slit groove is set to range from 5% to 30%, it is easy to release the outer joint member from the molding die at the time of cold-forging. In addition, areas required for the radially inner spherical-surface portions of the outer joint member can be secured, and hence required strength and durability can be secured. Note that, when the width dimension of the slit groove is smaller than 5%, it is difficult to release the outer joint member from the molding die at the time of cold-forging. Meanwhile, when the width dimension of the slit groove is larger than 30%, it is difficult to secure the areas required for the radially inner spherical-surface portions of the outer joint member, which leads to reduction of strength and deterioration of durability.

It is preferred that, at an opening end of each of the track grooves, a cutout round portion as each of the track-inlet chamfers be provided at least at a part corresponding to a ball-contact point.

Through provision of such cutout round portion, at the time of operation of the constant velocity universal joint at high angles, specifically, even when angles expected during use are exceeded for some reason so that a ball comes to a position at an axial end portion of corresponding one of the track grooves of the outer joint member, the cutout round portion can prevent the ball from biting into the axial end portion. At this time, it is preferred that the track grooves and the cutout round portions be finished by simultaneous cold-forging.

The track-inlet chamfers may be formed over the boundary portions between the track grooves and the cup-inlet chamfer. At this time, it is preferred that the track grooves and the cup-inlet chamfer be finished by simultaneous cold-forging.

Further, it is preferred that each of the track chamfers be formed into a convex round shape. When the track chamfer is formed into a convex round shape as described above, it is possible to avoid stress concentration at the portion. At this time, it is preferred that the track grooves and the track chamfers be finished by simultaneous cold-forging.

It is preferred that each of the track grooves have such a lateral-sectional Gothic arch shape as to be held in angular contact with a ball, and an angle formed by the angular contact be set to range from 35° to 45°. At such contact angle, a contact state of the ball with respect to corresponding one of the track grooves can be stabilized. Note that, when the ball-contact angle is less than 35°, track-surface pressure becomes higher, which may lead to a risk of deterioration of durability. In contrast, when the ball-contact angle is more than 45°, margins allowing the ball to climb onto the track shoulder portions at high operating angles decrease. As a result, at the time of high-torque application, the ball climbs onto the track shoulder portions while forming a contact ellipse, which may lead to a risk of chipping of the track shoulder portions, and the like.

It is preferred that a track offset angle formed between a line connecting a curvature center of each of the track grooves and a ball center of the ball fitted to corresponding one of the track grooves and a line connecting the ball center and a curvature center of corresponding one of the radially inner spherical-surface portions be set to range from 5.5° to 7.5°. At such track offset angle, operability, durability, and quasi-static torsional strength of the constant velocity universal joint can be simultaneously satisfied.

A curvature center of each of the track grooves can be shifted in a radial direction to such a position as to have a radius larger than a radius formed at a position on a joint axis. With this, a gap can be closed at a central position in the axial direction of each of the track grooves.

Advantageous Effects of Invention

On the outer joint member for a fixed type constant velocity universal joint according to the present invention, it is unnecessary to perform conventional finishing processes such as a cutting process and a grinding process after cold forging. Thus, yields can be increased, and manufacturing cost of the outer joint member, by extension, manufacturing cost of the constant velocity universal joint using the outer joint member can be reduced.

Further, through provision of the cup-inlet chamfer, even when the constant velocity universal joint forms an operating angle, an opening rim of the outer joint member is prevented from interfering with the shaft mounted to the inner joint member. Through provision of the track-inlet chamfer, an effective range in which the torque transmitting ball moves can be effectively secured. Through provision of the track chamfers, chipping of the track-groove edge portions can be prevented.

Through provision of the center hole into the end surface of the shaft section, properties of post processes (processing of a male spline, a male thread, and the like provided to the shaft) with use of the center hole can be enhanced. In particular, simultaneously with cold forging of the center hole, cold forging can be performed on the other parts. With this, the center hole constitutes a reference surface with respect to an axial position of the outer joint member, and hence the outer joint member can be molded at high axial-position accuracy. Thus, the outer joint member of the present invention is optimum as an outer joint member for a fixed type constant velocity universal joint of the BJ type that requires high axial-position accuracy.

When the finishing process after heat treatment is performed on the radially inner spherical-surface portions of the cup section, required high accuracy can be satisfied. Thus, a product (outer joint member) of high quality can be molded.

When the slit groove is formed in each of the radially inner spherical-surface portions and the width dimension of the slit groove is set to range from 5% to 30% of the maximum width dimension of each of the radially inner spherical-surface portions, a product (outer joint member) of high accuracy and high quality can be stably produced at low cost.

When each of the track grooves has such a lateral-sectional Gothic arch shape as to be held in angular contact with the ball and the angle formed by the angular contact is set to range from 35° to 45°, the contact state of the ball can be stabilized. As a result, a constant velocity universal joint can be structured, which is capable of smooth transmission of a rotational force and is excellent in durability.

By setting of the track offset angle to range from 5.5° to 7.5°, operability, durability, and strength of the constant velocity universal joint using the outer joint member can be satisfied. When the track offset angle is less than 5.5°, there are problems in all the following aspects: crosswise operability; durability; and quasi-static torsional strength. Meanwhile, when the track offset angle exceeds 7.5°, the constant velocity universal joint is poor in durability and strength.

When the curvature center of each of the track grooves is shifted in the radial direction to such a position as to have a radius larger than the radius formed at the position on the joint axis, the gap can be closed at the central position in the axial direction of each of the track grooves. As a result, backlash can be easily eliminated, and hence generation of abnormal noise can be suppressed.

DESCRIPTION OF EMBODIMENT

Figure 1:
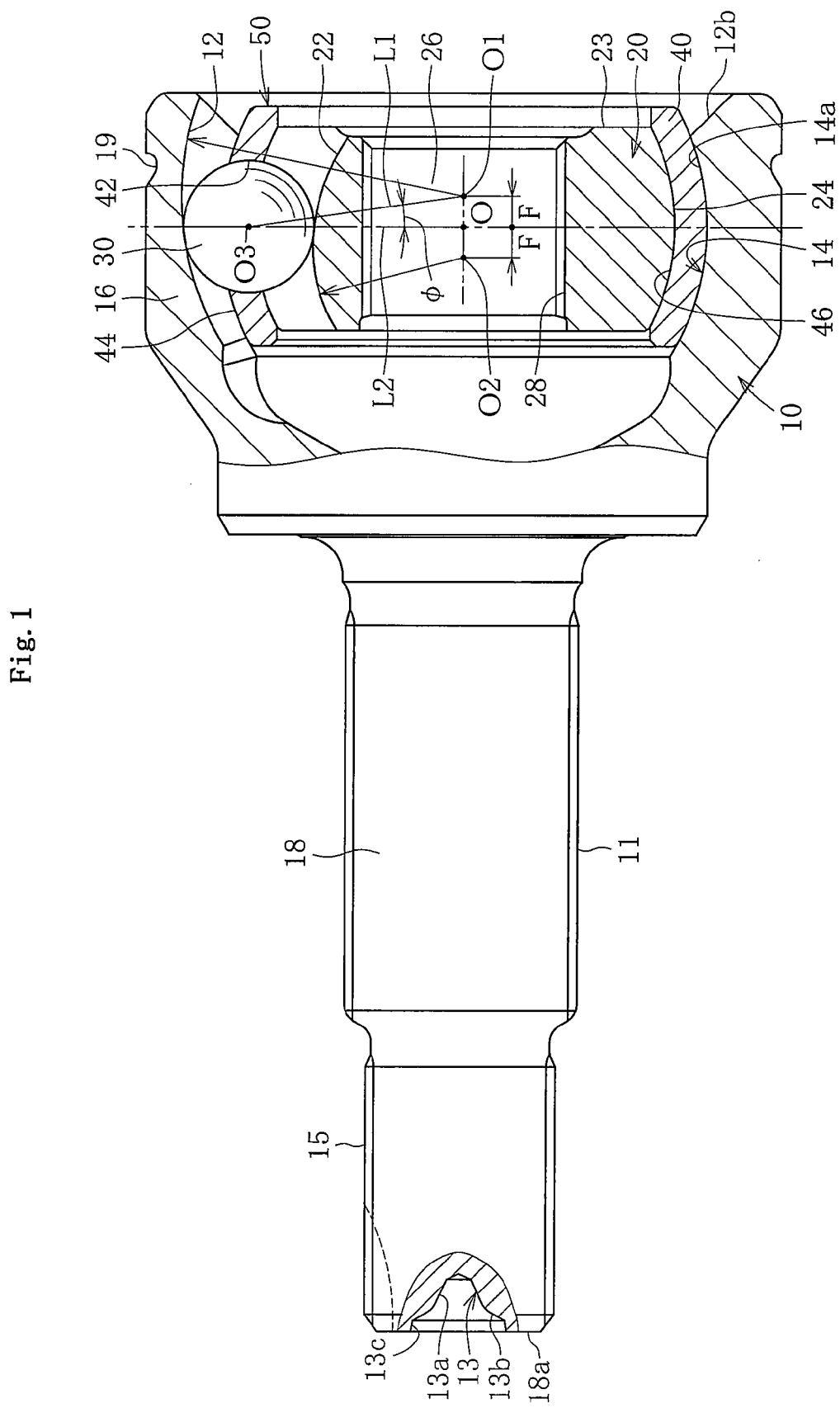
[FIG. 1] A sectional view of a fixed type constant velocity universal joint using an outer joint member according to an embodiment of the present invention.
Figure 2:
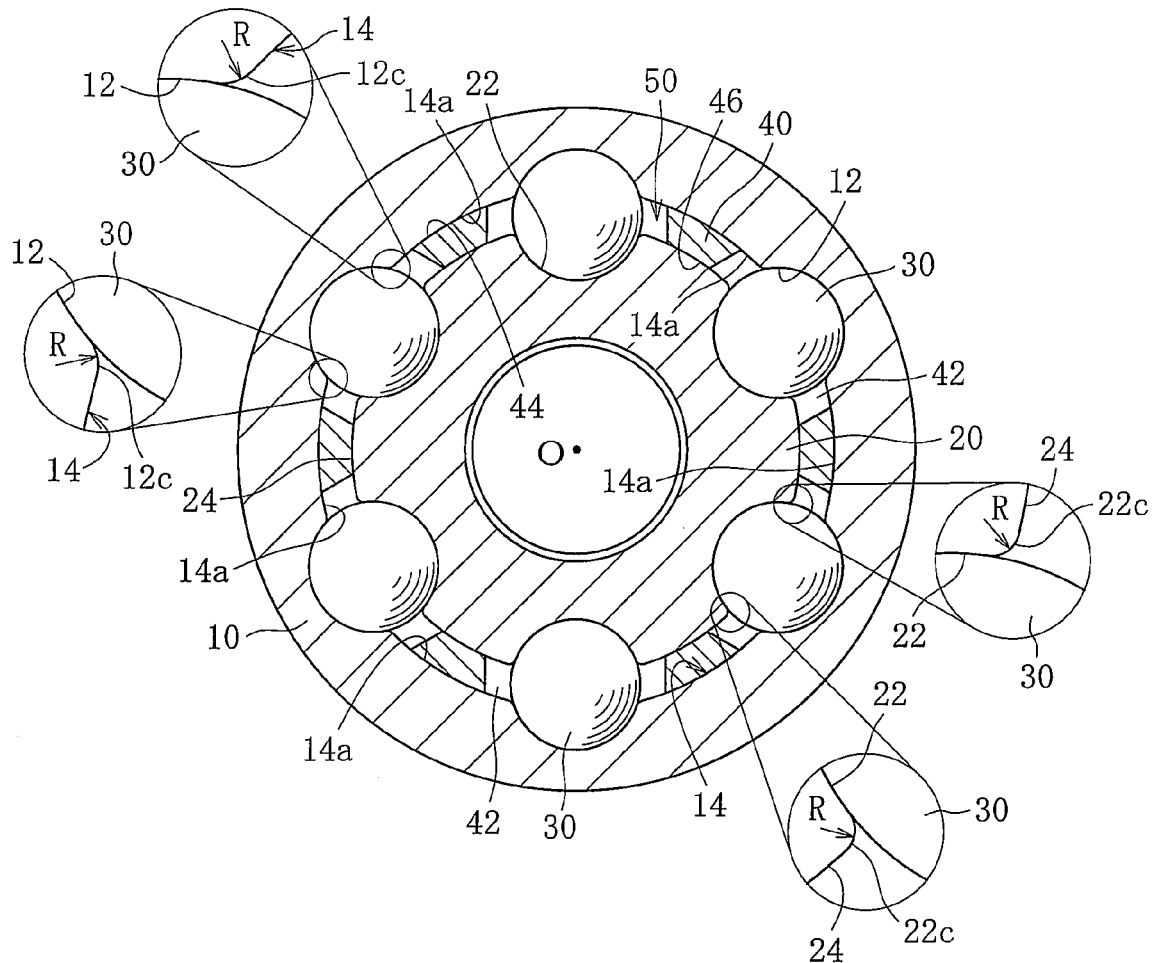
[FIG. 2] A lateral sectional view of the fixed type constant velocity universal joint.

In the following, description is made of an embodiment of the present invention with reference to FIGS. 1 to 19. FIGS. 1 and 2 illustrate a fixed type constant velocity universal joint using an outer joint member according to the present invention. The fixed type constant velocity universal joint is of a Birfield type, and includes, as main components, an outer race 10 as an outer joint member, an inner race 20 as an inner joint member, balls 30, and a cage 40. The fixed type constant velocity universal joint has a structure in which an interior component 50 including the inner race 20, the balls 30, and the cage 40 is housed in the outer race 10 so as to be capable of angular displacement.

The outer race 10 is made of machine-structural carbon steel, and has a cup-like shape so as to open at one end and has a radially inner surface 14 equiangularly provided with a plurality of track grooves 12 extending in an axial direction. Note that, parts between the track grooves adjacent to each other in a circumferential direction are referred to as radially inner spherical-surface portions 14a. The inner race 20 has an outer spherical surface 24 equiangularly provided with a plurality of track grooves 22 extending in the axial direction in pairs with the track grooves 12 of the outer race 10. The balls 30 are interposed between the track grooves 12 of the outer race 10 and the track grooves 22 of the inner race 20 so as to transmit torque. The cage 40 is interposed between the radially inner surface 14 of the outer race 10 and the outer spherical surface 24 of the inner race 20 so as to hold the balls 30.

It is preferred to set a carbon component of the machine-structural carbon steel to 0.37 wt % or more and 0.61 wt % or less, and more preferred to set to 0.50 wt % or more and 0.58 wt % or less. Specifically, the machine-structural carbon steel is desired to correspond to from S40C to S58C, and desirably, from S53C to S55C according to Japanese Industrial Standards (JIS).

The plurality of balls 30 are respectively housed in pockets 42 formed in the cage 40 and equiangularly arranged. In this embodiment, although six balls 30 are illustrated as an example, the number of the balls 30 is arbitrary. Each of the ball tracks formed of the track grooves 12 of the outer race 10 and the track grooves 22 of the inner race 20 in cooperation with each other exhibits such a wedge-like shape as to increase in diameter to an opening side of the outer race 10.

Note that, the outer race 10 includes a cup section (mouth section) 16 housing the interior component 50 including the inner race 20, the balls 30, and the cage 40, and a stem section (shaft section) 18 extending in the axial direction integrally from a bottom portion of the cup section 16. The shaft section 18 has an outer peripheral surface provided with a male spline 11 and an end-portion threaded portion 15 for coupling with respect to a wheel bearing (not shown). Further, the inner race 20 includes a shaft hole 26 provided with a spline 28 for coupling with respect to a shaft (not shown).

The shaft section 18 of the outer race 10 has an end surface 18a provided with a center hole 13. Further, a cup-inlet chamfer 12b is formed along an entire opening periphery of the cup section 16 of the outer race 10.

Track chamfers 12c formed along boundary portions between the radially inner spherical-surface portions 14a and the track grooves 12 of the outer race 10 and track chamfers 22c formed along boundary portions between the outer spherical surface 24 and the track grooves 22 of the inner race 20 are each formed into a round shape as illustrated in FIG. 2 in an enlarged manner. The round shapes of the track chamfers 12c and 22c are formed successively to provide smooth continuation respectively between the track grooves 12 and the radially inner spherical-surface portions 14a and between the track grooves 22 and the outer spherical surface 24.

Figure 3:
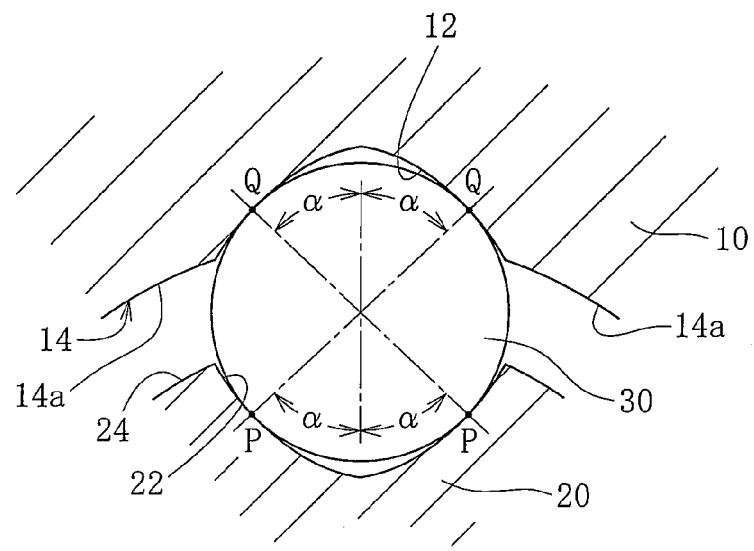
[FIG. 3] An enlarged sectional view of a shape of a track groove of the fixed type constant velocity universal joint.

Each of the track groove 12 of the outer race 10 and the track groove 22 of the inner race 20 has such a lateral-sectional Gothic arch shape as to be held in angular contact with the ball 30. For example, FIG. 3 illustrates the lateral sectional shape of each of the track groove 12 of the outer race 10 and the track groove 22 of the inner race 20. The track grooves 12 and 22 having the Gothic arch shapes respectively include such two ball-contact points Q and P (ball-contact angle $\alpha$) as to come into angular contact with the ball 30.

It is preferred that the ball-contact angles $\alpha$ formed at such two ball-contact points P or Q as to come into angular contact with the ball 30 range from 35 to 45°. By setting of the ball-contact angle $\alpha$ within the range defined as described above, a contact state of the ball 30 with respect to the track grooves 12 and 22 can be stabilized.

Figure 4A:
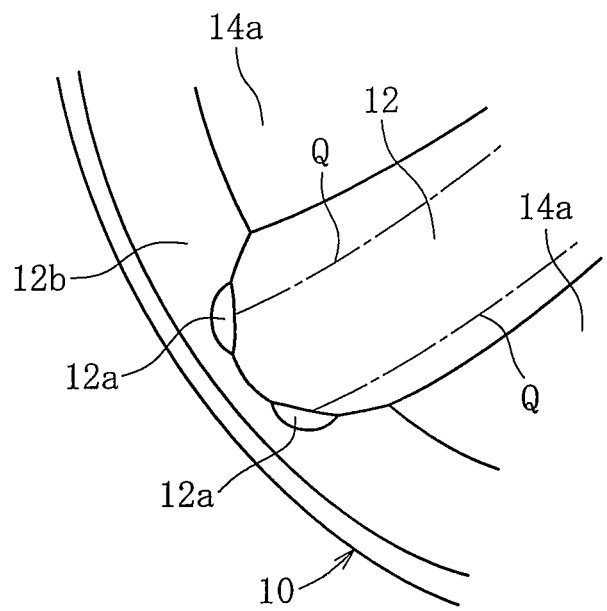
[FIG. 4A] A partially enlarged perspective view illustrating an example of a cutout round portion at an opening end portion of the outer joint member.
Figure 5A:
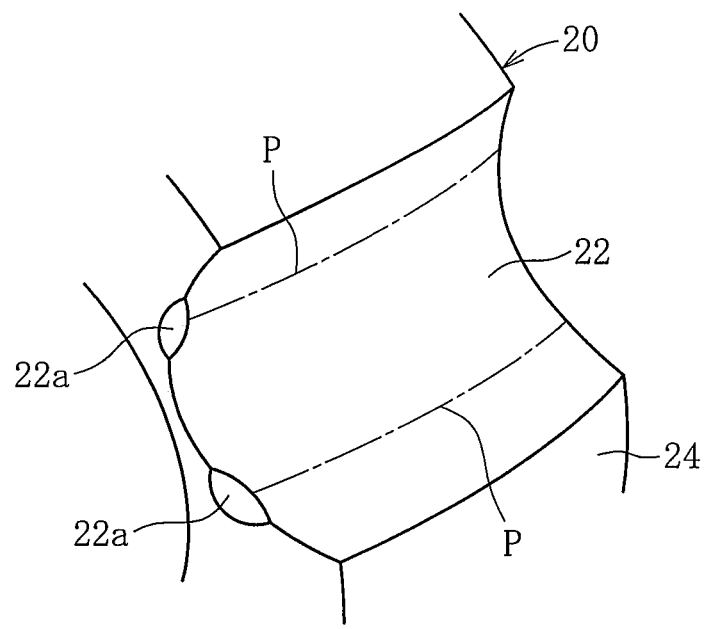
[FIG. 5A] A partially enlarged perspective view illustrating an example of a cutout round portion at an opening end portion of an inner joint member.

As illustrated in FIG. 4A, at an opening end of the track groove 12 of the outer race 10, there are provided cutout round portions as track-inlet chamfers 12a at parts corresponding to the ball-contact points. Further, as illustrated in FIG. 5A, at an opening end of the track groove 22 of the inner race 20, there are provided cutout round portions 22a at parts corresponding to the ball-contact points. At the parts corresponding to the ball-contact points, as described above, the track grooves 12 and 22 and the ball 30 come into angular contact with each other. Thus, as indicated by dashed lines in the figure, the two ball-contact points Q or P (illustrated as traces of the contact points in the figure) constitute such parts as to intersect the opening end of the track groove 12 or 22.

As described above, through provision of the cutout round portions 12a at the opening end of the track groove 12 of the outer race 10 and the cutout round portions 22a at the opening end of the track groove 22 of the inner race 20, at the time of operation of the constant velocity universal joint at high angles, specifically, even when angles expected during use are exceeded for some reason so that the ball 30 comes to a position at an axial end portion of the track groove 12 of the outer race 10 or of the track groove 22 of the inner race 20, the cutout round portions 12a and 22a prevent the ball 30 from biting into the axial end portion.

Figure 4B:
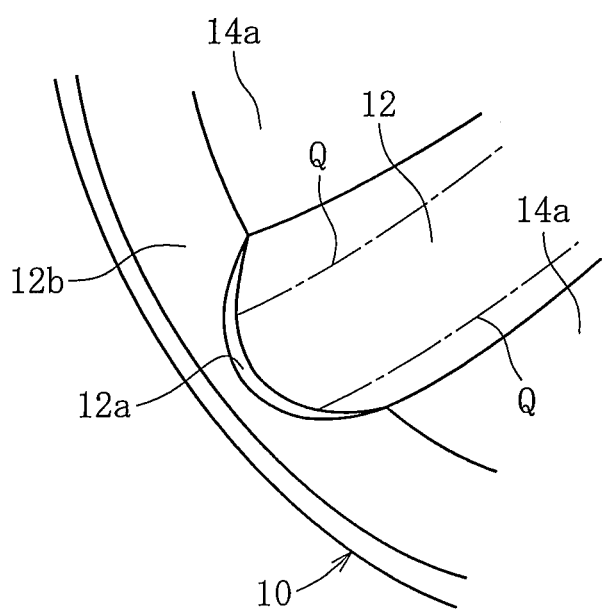
[FIG. 4B] A partially enlarged perspective view illustrating another example of the cutout round portion at the opening end portion of the outer joint member.
Figure 5B:
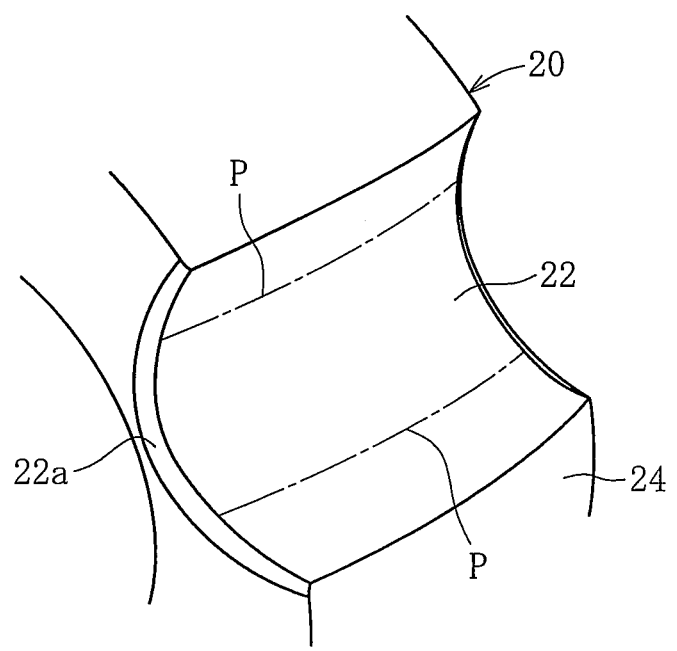
[FIG. 5B] A partially enlarged perspective view illustrating another example of the cutout round portion at the opening end portion of the inner joint member.

Note that, in the case described above, although the cutout round portions 12a and 22a are formed only at the parts corresponding to the ball-contact points at the opening end of the track groove 12 of the outer race 10 and the opening end of the track groove 22 of the inner race 20, as illustrated in FIGS. 4B and 5B, the cutout round portions 12a and 22a may be provided respectively over the opening end of the track groove 12 of the outer race 10 and over the opening end of the track groove 22 of the inner race 20. When the cutout round portions 12a and 22a are provided as described above respectively over the opening end of the track groove 12 of the outer race 10 and over the opening end of the track groove 22 of the inner race 20, the cutout round portions 12a and 22a constitute track-inlet chamfers described below.

Figure 6:
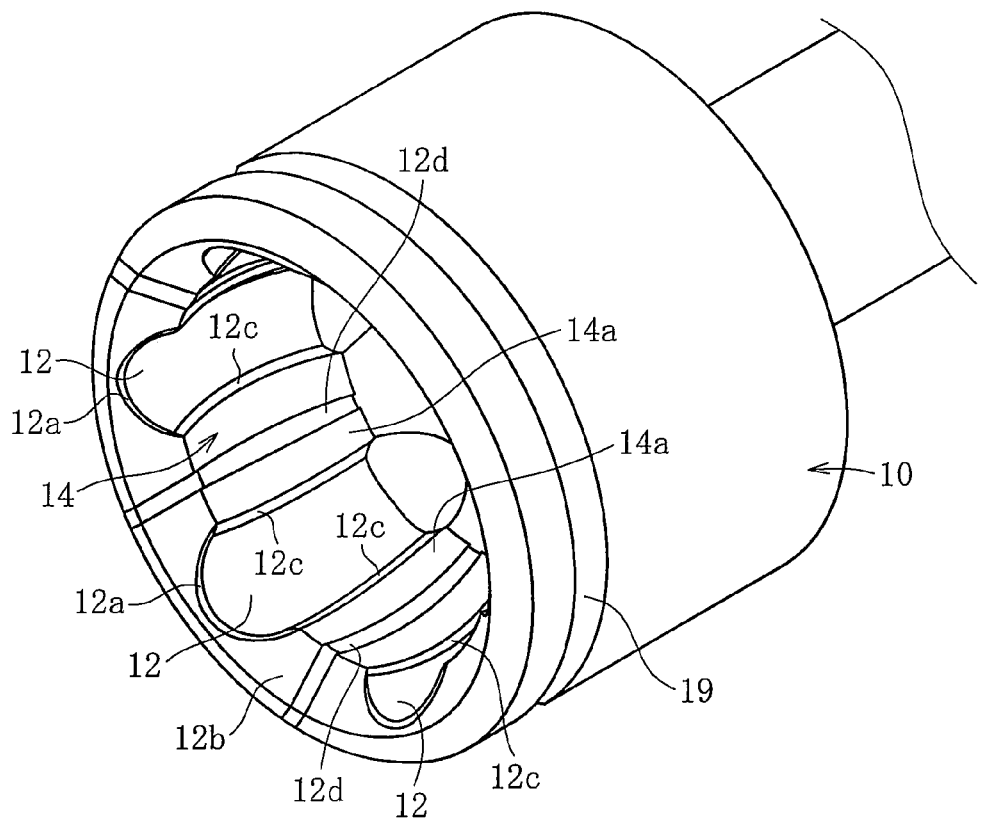
[FIG. 6] A partial perspective view of an outer race provided with a cup-inlet chamfer, track chamfers, track-inlet chamfers, and slit grooves.
Figure 7:
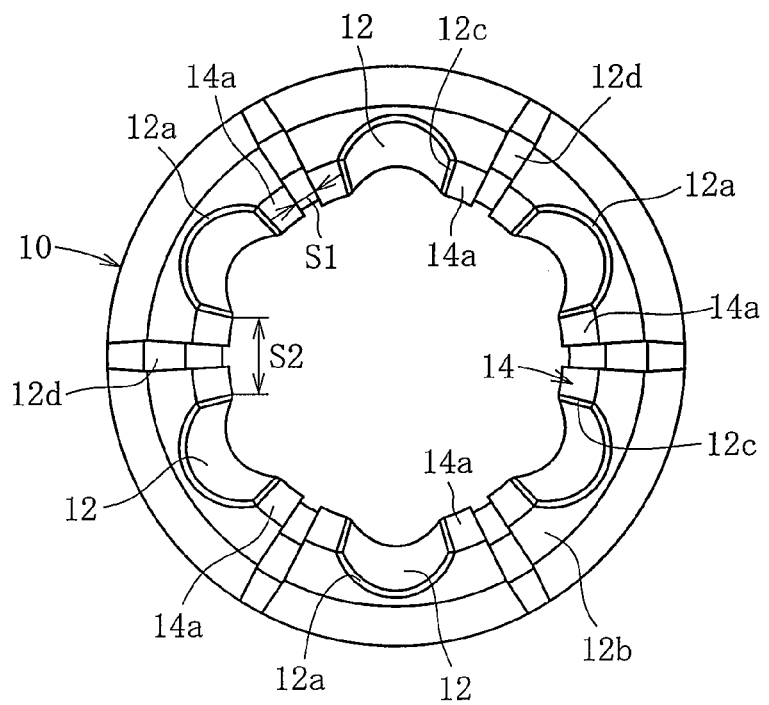
[FIG. 7] A side view illustrating a state in which the outer race of FIG. 6 is viewed from an opening-end side thereof.
Figure 8:
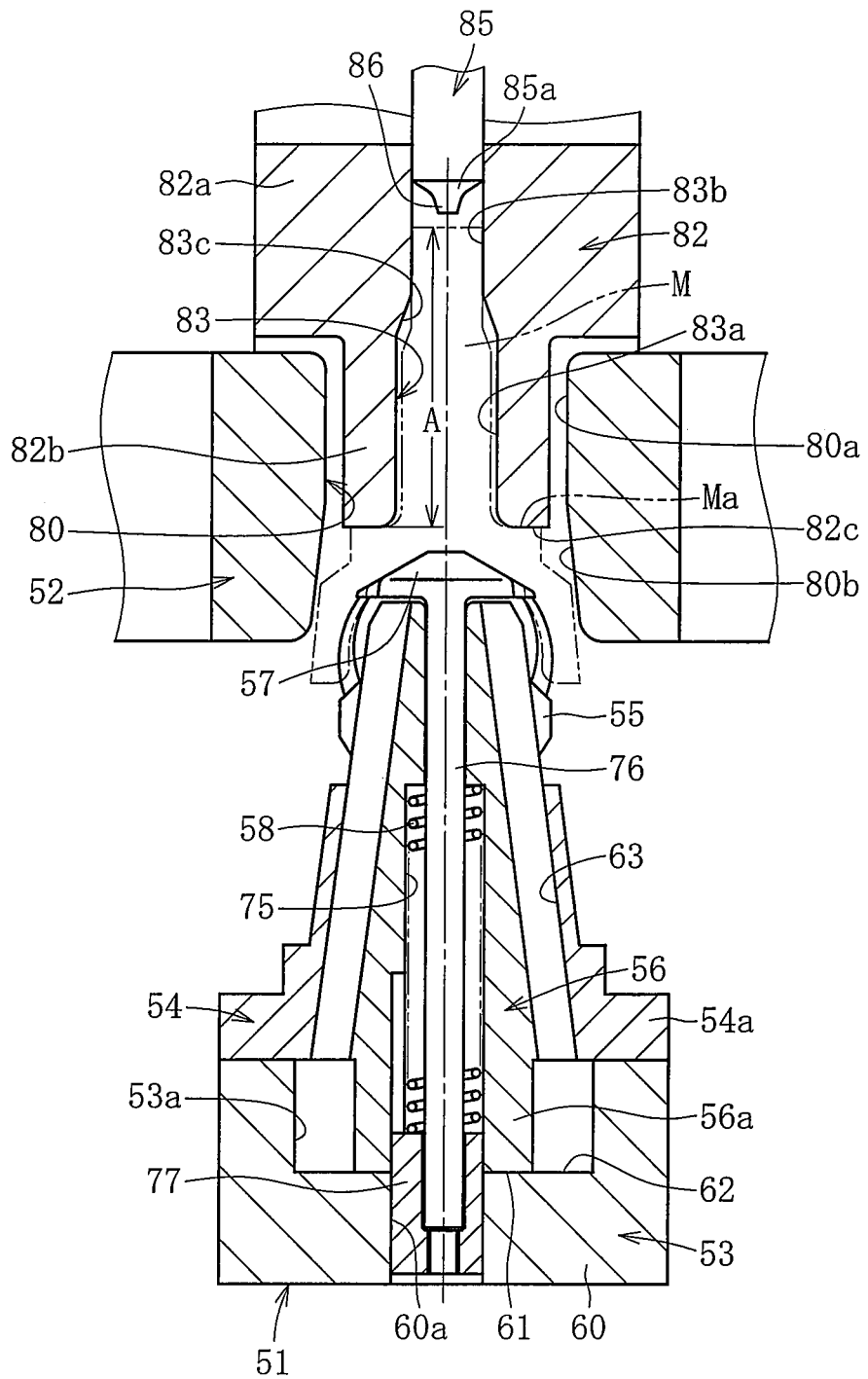
[FIG. 8] A sectional view of a forging apparatus for molding the outer joint member.
Figure 9:
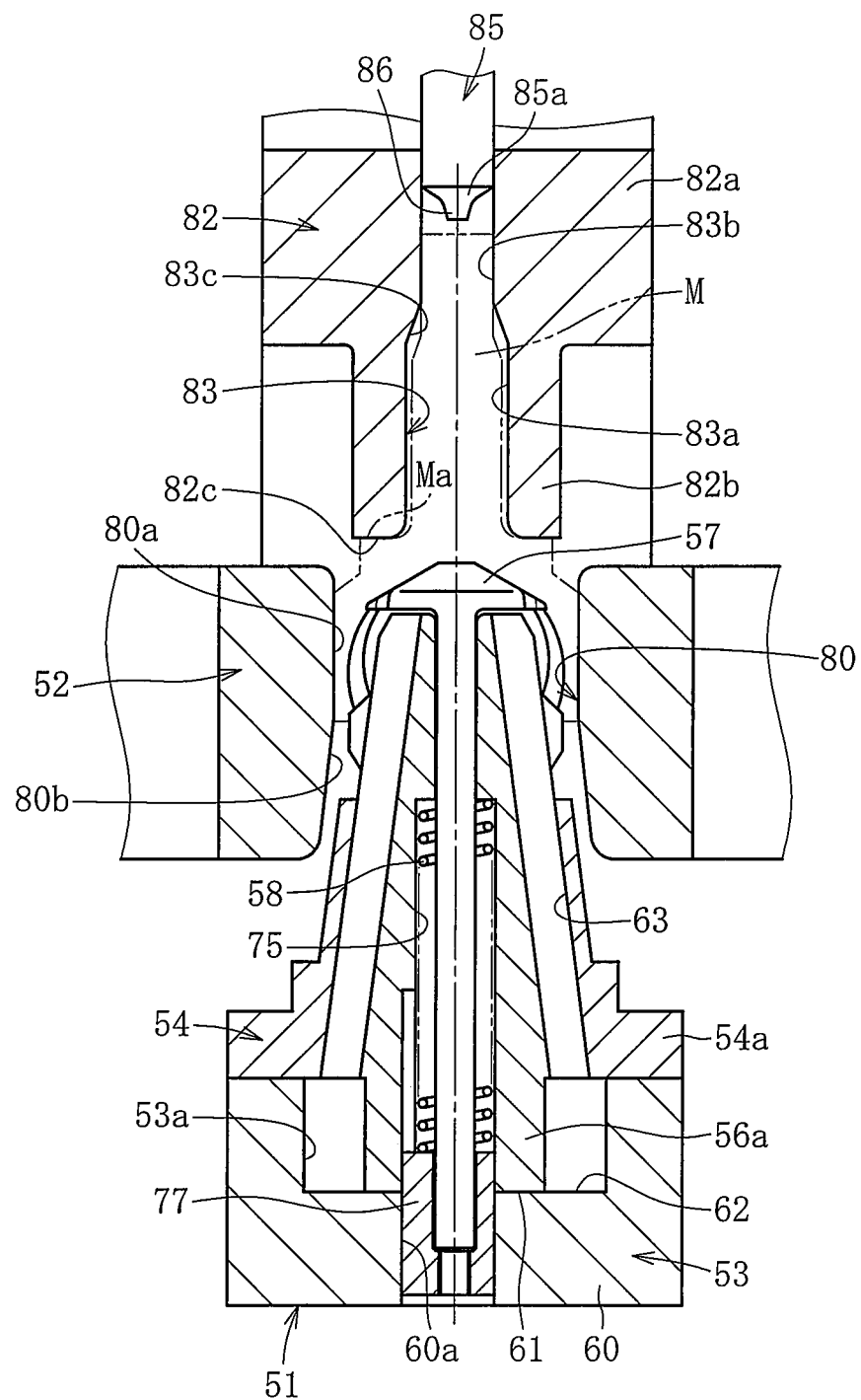
[FIG. 9] A sectional view of the forging apparatus at the time of molding.

In the outer race 10 provided with the track grooves 12, as illustrated in FIGS. 6 and 7, the following are formed: the cup-inlet chamfer 12b formed along the entire opening periphery of the outer race 10; the track chamfers 12c formed along the boundary portions between the radially inner spherical-surface portions 14a and the track grooves 12; and the track-inlet chamfers 12a formed along the boundary portions between the track grooves 12 and the cup-inlet chamfer 12b. Further, to an opening-end portion of the outer race 10, a boot (not shown) made of a resin or rubber is mounted for the purpose of preventing leakage of grease filling an inside of the joint and intrusion of water and foreign matter from an outside of the joint. Thus, a boot fixing portion 19 formed of a recessed groove is provided in an outer peripheral surface of the opening end of the outer race 10.

Further, slit grooves 12d extending in the axial direction between the track grooves 12 adjacent to each other in the circumferential direction are formed in the radially inner spherical-surface portions 14a of the outer race 10. The slit grooves 12d are formed to reach the radially inner spherical-surface portions 14a from an opening-end surface of the outer race 10 via the cup-inlet chamfer 12b. Note that, although six slit grooves 12d are illustrated as an example in this embodiment, the number of the slit grooves 12d is arbitrary. In this case, a width dimension S1 of each of the slit grooves 12d is set to range from 5% to 30% of a maximum width dimension S2 of each of the radially inner spherical-surface portions 14a between the track grooves 12 adjacent to each other in the circumferential direction. The slit grooves 12d are provided so as to prevent extruded portions of an outer-race unprocessed material M (refer to FIGS. 16 and 17) from intruding into gaps $\delta 1$ (refer to FIG. 10) between split punches 55 described below. Thus, the radially inner surface 14 of the outer race 10 is provided with the track grooves 12, the radially inner spherical-surface portions 14a between the track grooves 12 adjacent to each other in the circumferential direction, and the slit grooves 12d provided in the radially inner spherical-surface portions 14a.

When the number of the balls 30 is six, the maximum width dimension S2 is obtained at a vicinity of a middle in the axial direction of each of the radially inner spherical-surface portions 14a. However, in some form of the constant velocity universal joint or with some number of the balls, the maximum width dimension is not obtained at the vicinity of the middle in the axial direction of each of the radially inner spherical-surface portions 14a.

As illustrated in FIG. 1, a curvature center O1 of the track groove 12 of the outer race 10 and a curvature center O2 of the track groove 22 of the inner race 20 are offset to each other in the axial direction with respect to a joint center O by equal distances F onto opposite sides (the curvature center O1 of the track groove 12 is offset on an opening side of the joint, and the curvature center O2 of the track groove 22 is offset on an inner-portion side of the joint). Thus, the ball track exhibits such a wedge-like shape as to be wide on the opening side and gradually narrowed to the inner-portion side.

Further, both a curvature center of an outer spherical surface 44 of the cage 40 and a curvature center of the radially inner surface 14 of the outer race 10 correspond to the joint center O, the inner spherical surface 14 being held in sliding contact with the outer spherical surface 44. Still further, both a curvature center of an inner spherical surface 46 of the cage 40 and a curvature center of the outer spherical surface 24 of the inner race 20 also correspond to the joint center O, the outer spherical surface 24 being held in sliding contact with the inner spherical surface 46. When the outer race 10 and the inner race 20 undergo angular displacement with respect to each other, the balls 30 held by the cage 40 are constantly maintained, at any operating angle, within planes obtained by bisection of the operating angle. As a result, a constant velocity property of the joint is secured.

As illustrated in FIG. 1, a track offset angle $\phi$ formed between a line L1 connecting the curvature center O1 of the track groove 12 and a ball center O3 and a line L2 connecting the ball center O3 and the curvature center of the radially inner surface 14 (in other words, the joint center O) is set to range from 5.5° to 7.5°. The offset angle $\phi$ is lower than offset angles of conventional products (approximately 8.0°). Thus, a depth of the track groove 12 approximates to be uniform in the axial direction in comparison with that of conventional products.

In this case, the track grooves 12 are deeper at shallow parts than those of the conventional products. Thus, even under high load, the balls 30 are less liable to climb onto shoulder portions of the track grooves 12 while forming a contact ellipse, and hence chipping of the shoulder portions and the like are prevented. As a result, higher strength and durability of the track grooves 12 can be achieved. Further, a thickness of the cage 40 can be increased, and hence higher strength and prolonged life of the cage 40 can be achieved. Still further, as described above, when the offset angle $\phi$ falls within the above-mentioned range, operability can be satisfactorily maintained.

As a result, higher strength and durability of the track groove 12 of the outer race 10 can be achieved. Thus, as described below, the track grooves 12 of the outer race 10 are easily formed by cold-forging finishing. Further, a jumping-out force (axial force) of the ball 30 with respect to the joint-opening side is weakened in comparison with that of the conventional products, and hence generation of slapping noise owing to the axial force of the ball 30 can be suppressed.

Meanwhile, when the offset angle $\phi$ is excessively low, there is a risk that durability is deteriorated and strength decreases or problems with operability arise.

The following of the outer race 10 are finished by cold-forging: the track grooves 12; the radially inner spherical-surface portions 14a; the cup-inlet chamfer 12b; the track chamfers 12c; the track-inlet chamfers 12a; a part except for the boot fixing portion 19 formed in the radially outer surface of the cup section; and the center hole 13 of the end surface 18a of the shaft section 18. Temperature of the cold forging is set, for example, to 0° C. or more and 50° C. or less. Note that, as a matter of course, the temperature of the cold forging is not limited thereto.

In this case, in order to achieve higher torsional strength, heat treatment such as quenching is not performed on a radially outer surface of the outer race 10 that has undergone cold forging. With this, product strength is enhanced only by work hardening due to the cold forging. Further, excessively high hardness of the radially outer surface of the outer race 10 may lead to shortening of the life of a turning tool at the time of a turning process and the like for a groove in the boot fixing portion 19. Thus, surface hardness of the boot fixing portion 19 is set to range approximately from 250 HV to 350 HV.

Next, FIGS. 8 to 15 illustrate a manufacturing apparatus (forging apparatus) for molding into the outer joint member (outer race) 10. This apparatus includes a punch set 51 and a drawing die 52 which constitute an outer-race molding die assembly. The punch set 51 includes a punch-set body 53, a punch holder 54, the plurality of split punches 55, a punch base 56, an umbrella punch 57, and a spring 58.

The punch-set body 53 is formed of a bottomed short cylindrical body, and has a bottom wall 60 provided with a through-hole 60a in which a proximal end portion of a shaft portion 76 of the umbrella punch 57 is housed through intermediation of a support member 77. Further, a lower swelling portion 56a of the punch base 56 is fitted into a hole portion 53a of the punch-set body 53. Under a state in which a bottom surface 61 of the lower swelling portion 56a is held in contact with an inner surface 62 of the bottom wall 60, a flange portion 54a of the punch holder 54 is placed on and fixed to an upper surface of the punch-set body 53.

Figure 10:
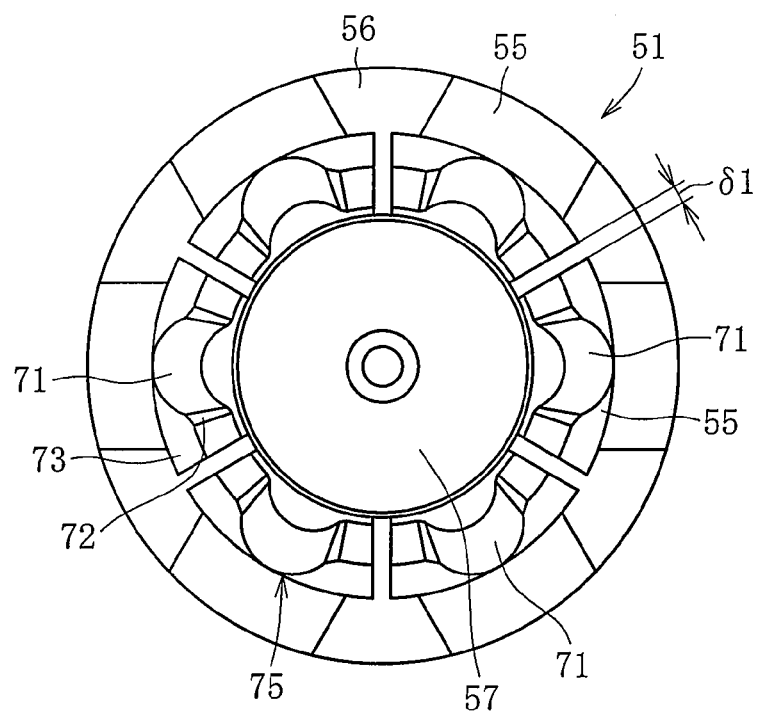
[FIG. 10] A plan view of a punch set of the forging apparatus.
Figure 11:
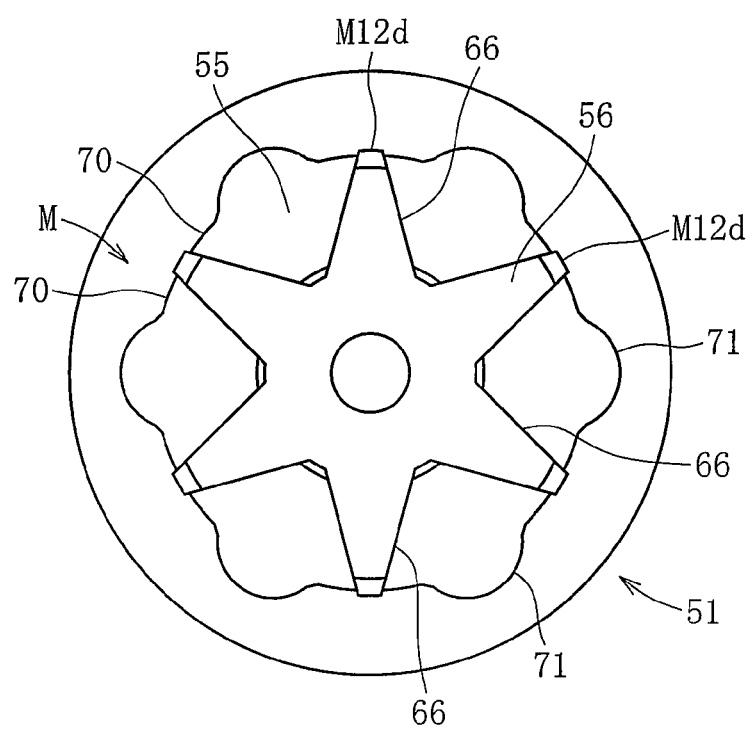
[FIG. 11] A sectional view of the punch set of the forging apparatus at the time of processing.
Figure 15A:
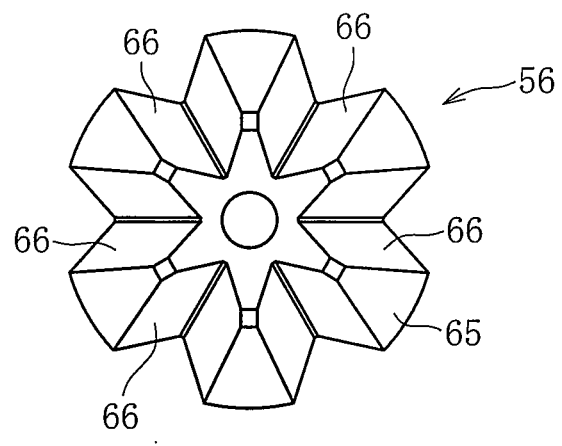
[FIG. 15A] A plan view of a punch base of the forging apparatus.
Figure 15B:
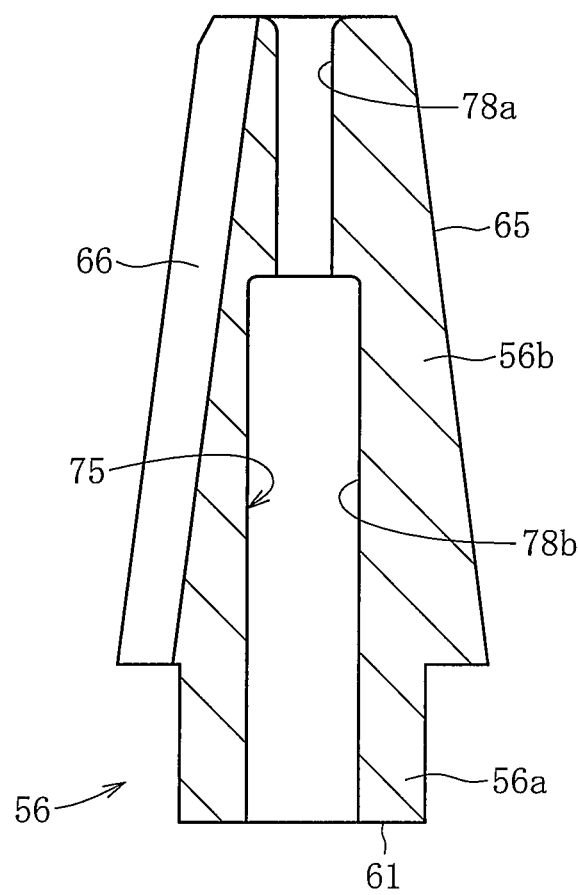
[FIG. 15B] A sectional view of the punch base of the forging apparatus.

The punch holder 54 includes a tapered hole 63 formed therein, and to the tapered hole 63, the plurality of split punches 55, the punch base 56, and the like are provided. On the punch base 56, the plurality of split punches 55 are arranged at fixed intervals in the circumferential direction. As illustrated in FIGS. 15A and 15B, the punch base 56 includes a punch-base body 56b for arrangement of those split punches 55 and the above-mentioned swelling portion 56a provided continuously with a lower end of the punch-base body 56b. In a tapered outer peripheral portion 65 of the punch-base body 56b, a plurality of (six in this case) splitting partition grooves 66 are formed. As illustrated in FIGS. 10 and 11, the split punches 55 arranged along the circumferential direction are interposed between the splitting partition grooves 66. Note that, a taper angle of the tapered outer peripheral portion 65 corresponds to a taper angle of the tapered hole 63.

Figure 12:
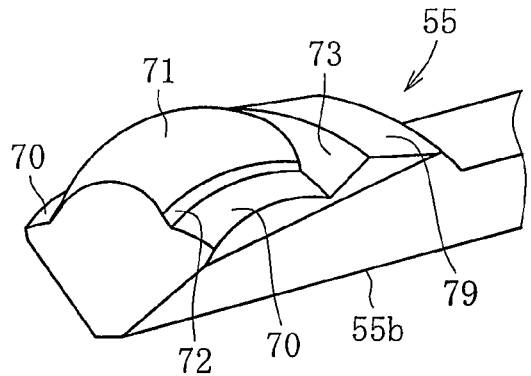
[FIG. 12] A main-part perspective view of a split punch of the punch set.
Figure 13:
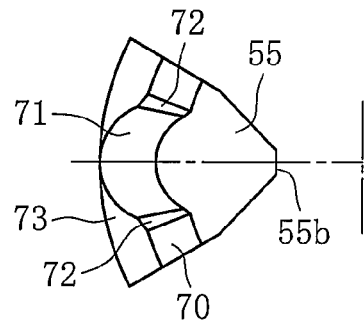
[FIG. 13] A plan view of the split punch of the punch set.
Figure 14:
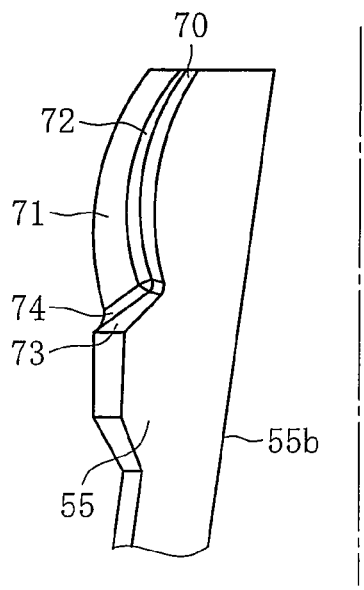
[FIG. 14] A side view of the split punch of the punch set.

Each of the split punches 55 is formed of a member having a substantially sector shape in cross-section, and includes, as illustrated in FIGS. 12 to 14, radially-inner-spherical-surface-portion molding portions 70, a track-groove molding portion 71, track-chamfer molding portions 72, a cup-inlet-chamfer molding portion 73, and a track-inlet-chamfer molding portion 74.

The track-groove molding portion 71 is provided for molding of the track groove 12 of the outer race 10, and provided with the radially-inner-spherical-surface-portion molding portions 70 and 70 formed on both sides thereof for molding of the radially inner spherical-surface portions of the outer race 10. Further, the track-chamfer molding portions 72 are formed at boundary portions between the track-groove molding portion 71 and the radially-inner-spherical-surface-portion molding portions 70. The cup-inlet-chamfer molding portion 73 is provided for molding of the cup-inlet chamfer 12b of the outer race 10, and formed of lower edges of the radially-inner-spherical-surface-portion molding portions 70, a lower edge of the track-groove molding portion 71, lower ends of the track-chamfer molding portions 72, and an upper surface of a trunk portion 79 arranged below the track-groove molding portion 71. Note that, as a result of arrangement of the plurality of split punches 55 along the circumferential direction, the trunk portion 79 constitutes an annular portion.

The cup-inlet-chamfer molding portion 73 is formed into such a tapered shape as to be inclined downward toward an outer side in a radial direction, and the tapered cup-inlet-chamfer molding portion 73 enables setting of a predetermined angle of the cup-inlet chamfer 12b of the outer race 10. The track-inlet-chamfer molding portion 74 is provided for molding of the track-inlet chamfer 12a of the outer race 10, and formed along a boundary portion between the cup-inlet-chamfer molding portion 73 and the track-groove molding portion 71.

As described above, the radially-inner-spherical-surface-portion molding portions 70, the track-groove molding portion 71, the track-chamfer molding portions 72, the cup-inlet-chamfer molding portion 73, and the track-inlet-chamfer molding portion 74 are provided integrally to each of the split punches 55. Thus, in comparison with those separately formed, dimensional accuracy of the molding portions can be enhanced and mutual dimensional differences therebetween can be reduced. In other words, with use of the above-mentioned manufacturing apparatus (forging apparatus), the dimensional accuracy of the molding portions can be enhanced and the mutual dimensional differences therebetween can be reduced.

Each of the split punches 55 is inclined in such a manner that a ridge-line portion 55b on a radially inner side thereof extends along a tapered portion of the punch-base body 56b, and hence is capable of vertical movement along the tapered portion. Further, a through-hole 75 is formed in the punch base 56, and the shaft portion 76 projected from the umbrella punch 57 is inserted through the through-hole 75. A lower end portion of the shaft portion 76 is supported by the support member 77 arranged in the through-hole 60a of the bottom wall 60 of the punch-set body 53.

As illustrated in FIG. 15B, the through-hole 75 includes a small diameter portion 78a and a large diameter portion 78b, and the spring 58 externally fitted to the shaft portion 76 is arranged in the large diameter portion 78b. With this, the umbrella punch 57 provided continuously with the shaft portion 76 is elastically urged downward so as to regulate (press) upper edges of the split punches 55.

The drawing die 52 includes a through-hole portion 80 for molding of the radially outer surface of the outer race 10. The through-hole portion 80 includes an upper straight hole 80a and a lower tapered hole 80b. The tapered hole 80b widens downward.

Further, a projecting portion 82b of a shaft-section molding die 82 is inserted into the through-hole portion 80 of the drawing die 52. The shaft-section molding die 82 includes a die body 82a, the projecting portion 82b projected from a lower surface of the die body 82a, and a hole portion 83 into which the shaft section of the outer race 10 is inserted. The hole portion 83 includes a large diameter portion 83a for molding of a male-spline-forming part of the shaft section, a small diameter portion 83b for molding of a male-threaded-portion-forming part of the shaft section, and a tapered portion 83c between the large diameter portion 83a and the small diameter portion 83b.

A center-hole-molding punch 85 for molding of the center hole 13 of the end surface 18a of the shaft section 18 of the outer race 10 is fitted into the small diameter portion 83b of the hole portion 83 of the drawing die 52. A radially outer surface of the center-hole-molding punch 85 faces a radially inner surface of the small diameter portion 83b with a slight gap. A cone portion 85a for molding of the center hole 13 is provided at a lower end of the center-hole-molding punch 85.

By the way, as illustrated in FIG. 1, the center hole 13 includes a reference-tapered-hole portion 13a as a center-hole reference, an opening-side-tapered-hole portion 13b provided continuously with an opening rim of the reference-tapered-hole portion 13a, and a large-diameter opening portion 13c provided continuously with an opening rim of the opening-side-tapered-hole portion 13b. Thus, a reference tapered part 86 for molding of the reference-tapered-hole portion 13a is formed on an outer surface of the cone portion 85a of the center-hole-molding punch 85.

Figure 16:
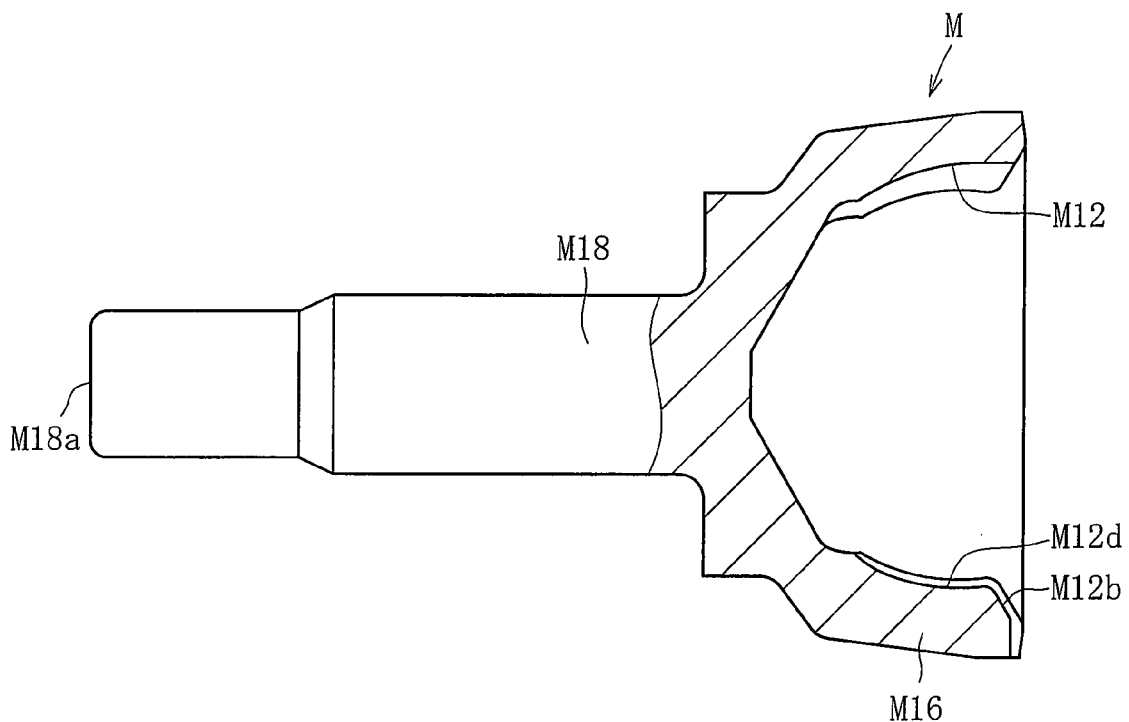
[FIG. 16] A partial sectional side view of an outer-race unprocessed material.
Figure 17:
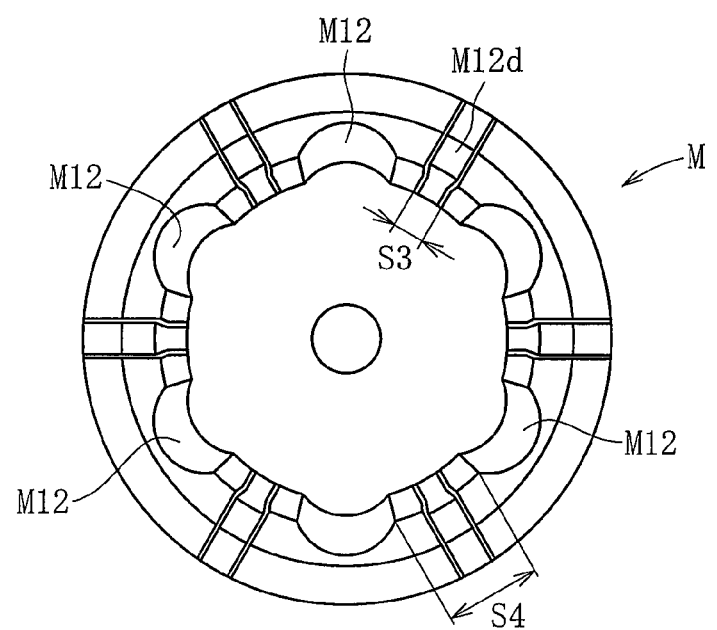
[FIG. 17] A plan view of the outer-race unprocessed material

When the outer race 10 is molded with use of the manufacturing apparatus (forging apparatus), the outer-race unprocessed material M as illustrated in FIGS. 16 and 17 is formed in advance. The outer-race unprocessed material M is put into the manufacturing apparatus (forging apparatus), and then cold forging is performed. The outer-race unprocessed material M is molded through plastic processing such as warm forging, hot forging, or semi-hot forging. Specifically, the outer-race unprocessed material M includes a cup section M16 and a shaft section M18 provided continuously with a bottom portion of the cup section M16. Track grooves M12 and slit grooves M12d are formed in a radially inner surface of the cup section M16. Further, a cup-inlet chamfer M12b is formed on an opening end surface of the cup section M16 of the outer-race unprocessed material M.

In addition, the slit grooves M12d of radially inner spherical-surface portions of the cup section M16 are provided between the track grooves M12 adjacent to each other in the circumferential direction. It is preferred to set a groove width S3 of each of the slit grooves M12d to 10% or more and 40% or less of a maximum width dimension S4 of each of the radially inner spherical-surface portions. With this setting, groove width dimensions of slit grooves of a product (outer race 10) can be set to 5% or more and 30% or less of maximum width dimensions of radially inner spherical-surface portions (island-like radially inner spherical-surface portions separated by track grooves).

Next, description is made of a method of molding the outer race with use of the manufacturing apparatus (forging apparatus) structured as described above. The outer-race unprocessed material M molded in advance is inserted into the through-hole portion 80 of the drawing die 52. Then, the punch set 51 is moved relative to the drawing die 52. As a result, the umbrella punch 57 is brought into contact with a spherical bottom portion of an inner surface of the cup section M16 of the outer-race unprocessed material M, and each of the split punches 55 is fitted to the track groove M12 of the inner surface thereof.

In this state, the punch set 51 is further relatively moved, with the result that the cup section M16 of the outer-race unprocessed material M undergoes a drawing action of the drawing die 52 so as to be reduced in diameter inward in the radial direction. At the time of drawing, a surface of the track groove M12 is restrained by the track-groove molding portion 71 of each of the split punches 55. As a result, the track groove 12, the radially inner spherical-surface portions 14a, and the track chamfers 12c are plastically deformed respectively by the track-groove molding portion 71, the radially-inner-spherical-surface-portion molding portions 70, and the track-chamfer molding portions 72. Further, simultaneously, at the time of the drawing, the cup-inlet chamfer 12b and the track-inlet chamfer 12a are plastically processed respectively by the cup-inlet-chamfer molding portion 73 and the track-inlet-chamfer molding portion 74.

In this case, plastic processing (cold forging) is performed also on the part except for the boot fixing portion 19 on the radially outer surface of the cup section 16. Further, at the time of the drawing, the cone portion 85a of the center-hole-molding punch 85 is pressed against an end surface M18a of the shaft section M18 of the outer-race unprocessed material M. In this manner, the center hole 13 is molded. That is, the shaft-section molding die 82 and the center-hole-molding punch 85 are simultaneously pressed against the outer-race unprocessed material M, and then movement of the outer-race unprocessed material M is restrained. In this manner, the center hole 13 is molded. With this, inside accuracy of the cup section 16 can be enhanced owing to prevention of die releasing, and simultaneously, the center hole 13 can be molded.

The center-hole-molding punch 85 is guided by a radially inner surface of the shaft-section molding die 82 with a slight gap. When the shaft-section molding die 82 is pressed against the outer-race unprocessed material M, a shaft-section-radially-outer portion of the outer-race unprocessed material M undergoes an ironing process by the large diameter portion 83*a* of the hole portion 83 of the shaft-section molding die 82. Thus, while being guided by the radially inner surface of the shaft-section molding die 82 that has undergone centering concentric with the outer-race unprocessed material M, the center-hole-molding punch 85 forms the center hole 13 into the end surface 18*a* of the shaft section 18 of the outer race 10. Thus, concentricity of the center hole 13 with respect to a shaft-section outer diameter of the outer race 10 is secured at high accuracy.

Further, at the time of molding of the center hole 13, such setting is performed that an axial position of the center-hole-molding punch 85 and an axial position of the shaft-section molding die 82 are fixed. Thus, a relative position of the center-hole-molding punch 85 and a relative position of a reference surface 82*c* of the shaft-section molding die 82 are fixed. In formation of the center hole 13 by a pressing-force imparting method, molding is performed always with reference to a reference surface Ma of the outer-race unprocessed material M. Thus, an axial position of the center hole 13 thus molded with respect to the raw-material reference surface Ma, that is, a dimension A can be secured at high accuracy.

As described above, with use of the manufacturing apparatus (forging apparatus), it is possible to mold the outer race 10 which includes the following finished by cold-forging: the track grooves 12; the radially inner spherical-surface portions 14*a*; the cup-inlet chamfer 12*b*; the track chamfers 12*c*; the track-inlet chamfers 12*a*; the part except for the boot fixing portion 19 formed in the radially outer surface of the cup section 16; and the center hole 13 of the end surface 18*a* of the shaft section 18. Note that, the boot fixing portion 19 undergoes groove processing by a turning process and the like.

By the way, in some cases, strict accuracy is required for the radially inner spherical-surface portions 14*a* of the cup section 16, and hence a finishing process may be performed after heat treatment. Here, examples of the heat treatment include induction-hardening treatment. Further, examples of the finishing process include a cutting process and a grinding process. The induction hardening is a quenching method in which a part required to be quenched is surrounded by a coil carrying high-frequency current and which applies such a principle as to generate Joule heat by electromagnetic induction so as to heat a conductive body. At some accuracy required for the radially inner spherical-surface portions, the radially inner spherical-surface portions may be finished only by cold forging.

As described above, when the finishing process after heat treatment is performed on the radially inner spherical-surface portions 14*a* of the cup section 16, required high accuracy can be satisfied. Thus, products (outer joint members) of high quality can be molded.

The outer joint member for a fixed type constant velocity universal joint according to the present invention is made of machine-structural carbon steel, and the following are finished by cold forging: the track grooves 12; the radially inner spherical-surface portions 14*a*; the cup-inlet chamfer 12*b*; the track chamfers 12*c*; the track-inlet chamfers 12*a*; the part except for the boot fixing portion 19 on the radially outer surface of the cup section 16; and the center hole 13 at the end surface 18*a* of the shaft section 18. Thus, on those parts, it is unnecessary to perform conventional finishing processes such as a cutting process and a grinding process after cold forging. Thus, yields can be increased, and manufacturing cost of the outer joint member, by extension, manufacturing cost of the constant velocity universal joint using the outer joint member can be reduced.

A large part of the cup section 16 is finished by cold forging, and hence strength of the product can be enhanced. In particular, when the outer race 10 is obtained by forging finishing of machine-structural carbon steel containing a high carbon component of 0.37 wt % or more, desired high surface hardness of the inner and outer surfaces of the cup section 16 can be achieved. With this, a life of the product can be prolonged. Setting of an upper limit of the carbon component of the machine-structural carbon steel as a raw material to 0.61 wt % or less enables cold forging without involving processing incapability due to excessively high hardness. Further, even without use of especially hard materials, the outer race 10 is molded by cold forging, and hence hardness of the radially outer surface of the cup section 16 of the outer race 10 becomes higher owing to work hardening. As a result, the outer race 10 having high rigidity and high strength can be obtained.

Further, through provision of the cup-inlet chamfer 12*b*, even when the constant velocity universal joint forms an operating angle, the opening rim of the outer race 10 is prevented from interfering with the shaft mounted to the inner race 20. Through provision of the track-inlet chamfer 12*a*, an effective range in which the torque transmitting ball 30 moves can be effectively secured. Through provision of the track chamfers 12*c*, chipping of the track-groove edge portions is prevented. When the track chamfers 12*c* are each formed into a convex round shape, it is possible to avoid stress concentration at the portions.

Through provision of the center hole 13 into the end surface 18*a* of the shaft section 18, properties of post processes (processing of a male spline, a male thread, and the like provided to the shaft) with use of the center hole 13 can be enhanced. In particular, simultaneously with cold forging of the center hole 13, cold forging can be performed on the other parts. With this, the center hole 13 constitutes a reference surface with respect to an axial position of the outer race 10, and hence the outer race 10 can be molded at high axial-position accuracy. Thus, the outer joint member (outer race 10) of the present invention is optimum as an outer race for a fixed type constant velocity universal joint of the BJ type that requires high axial-position accuracy.

When the slit groove 12*d* is formed in each of the radially inner spherical-surface portions 14*a* and the width dimension of the slit groove 12*d* is set to range from 5% to 30% of the maximum width dimension of each of the radially inner spherical-surface portions 14*a*, a product (outer race 10) of high accuracy and high quality can be stably produced at low cost. That is, at the time of cold forging, the extruded portions of the outer-race unprocessed material M are prevented from intruding into the circumferential gaps δ1 between the divided punches divided in the circumferential direction. Note that, when the width dimension of each of the slit grooves is smaller than 5%, it is difficult to release the outer joint member from the molding die at the time of cold forging. In contrast, when the width dimension of each of the slit grooves is larger than 30%, it is difficult to release areas required for the radially inner spherical-surface portions 14*a* of the outer race 10, which leads to deterioration of strength and durability.

When each of the track grooves 12 has such a lateral-sectional Gothic arch shape as to be held in angular contact with the ball 30 and the angle formed by the angular contact is set to range from 35° to 45°, the contact state of the ball 30 can be stabilized. As a result, a constant velocity universal joint can be structured, which is capable of smooth transmission of a rotational force and is excellent in durability. Note that, when the ball-contact angle is less than 35°, track-surface pressure becomes higher, which may lead to a risk of deterioration of durability. In contrast, when the ball-contact angle is more than 45°, margins allowing the ball to climb onto the track shoulder portions at high operating angles decrease. As a result, at the time of high-torque application, the ball climbs onto the track shoulder portions while forming a contact ellipse, which may lead to a risk of chipping of the track shoulder portions, and the like.

By setting of the track offset angle to range from 5.5° to 7.5°, operability, durability, and strength of the constant velocity universal joint using the outer race 10 can be satisfied. When the track offset angle is less than 5.5°, there are problems in all the following aspects: crosswise operability; durability; and quasi-static torsional strength. Meanwhile, when the track offset angle exceeds 7.5°, the constant velocity universal joint is poor in durability and strength.

Figure 18:
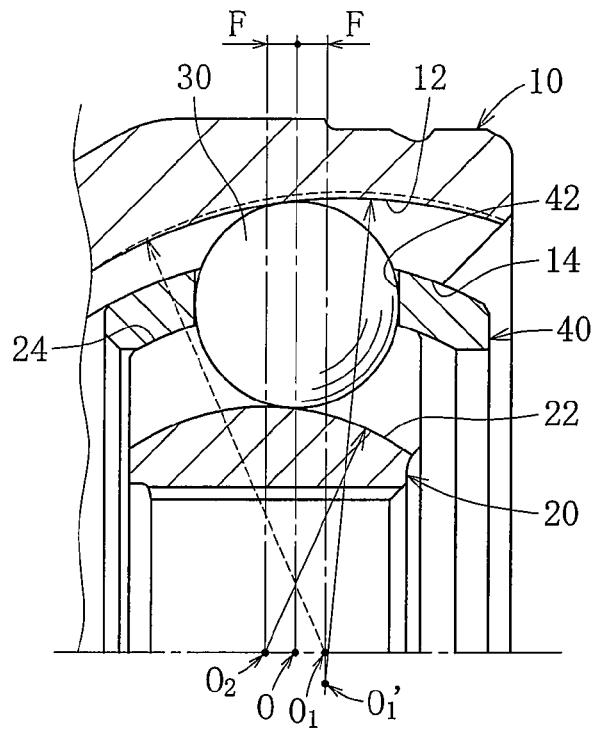
[FIG. 18] A partial sectional view of a constant velocity universal joint in which a curvature center of a track groove of the outer race is shifted in a radial direction to such a position as to have a radius larger than a radius formed at a position on a joint axis.
Figure 19:
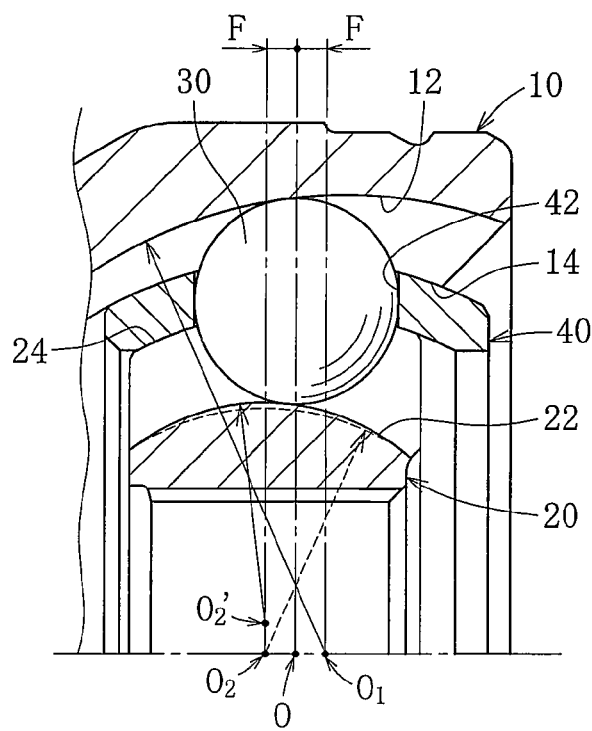
[FIG. 19] A partial sectional view of the constant velocity universal joint in which a curvature center of a track groove of the inner race is shifted in the radial direction to such a position as to have a radius smaller than a radius formed at a position on the joint axis.

By the way, as illustrated in FIG. 18, a curvature center O1' of each of the track grooves 12 of the outer race 10 may be shifted in the radial direction to such a position as to have a radius larger than the radius formed at the position on the joint axis. Further, as illustrated in FIG. 19, a curvature center O2' of each of the track grooves 22 of the inner race 20 may be shifted in the radial direction to such a position as to have a radius smaller than the radius formed at the position on the joint axis.

As described above, when the curvature center O1' of the track groove 12 of the outer race 10 is shifted in the radial direction to such a position as to have the radius larger than the radius formed at the position on the joint axis, or when the curvature center O2' of the track groove 22 of the inner race 20 is shifted in the radial direction to such a position as to have the radius smaller than the radius formed at the position on the joint axis, gaps can be closed at central positions in the axial direction of the track grooves 12 and 22. As a result, backlash can be easily eliminated, and hence generation of abnormal noise can be suppressed.

Hereinabove, although description is made of the embodiment of the present invention, the present invention is not limited to the above-mentioned embodiment, and various modifications may be made thereto. For example, in the above-mentioned embodiment, although being used for a fixed type constant velocity universal joint of a Birfield type (BJ) in which a bottom surface of the track groove is constituted only by a circular-arc portion, the outer joint member may be used for a fixed type constant velocity universal joint of an undercut free type (UJ) in which the bottom surface of the track groove includes both the circular-arc portion and a linear portion. Further, the number of the track grooves 12 is not limited to six, and may be arbitrarily increased or decreased.

A shape of the center hole is not limited to that illustrated in FIG. 1 as long as at least the reference-tapered-hole portion 13a is provided.

INDUSTRIAL APPLICABILITY

The outer joint member of the present invention is applicable to the fixed type constant velocity universal joint of the Birfield type (BJ) in which the bottom surface of the track groove is constituted only by the circular-arc portion, or to the fixed type constant velocity universal joint of the undercut free type (UJ) in which the bottom surface of the track groove includes both the circular-arc portion and the linear portion. The outer joint member is made of machine-structural carbon steel corresponding to from S40C to S58C, or from S53C to S55C according to Japanese Industrial Standards (JIS).

REFERENCE SIGNS LIST 12 track groove
12a cutout round portion (track-inlet chamfer)
12b cup-inlet chamfer
12c, 22c track chamfer
12d slit groove
13 center hole
14 radially inner surface
14a radially inner spherical-surface portion
16 cup section
18 shaft section
18a end surface
19 boot fixing portion
70 radially-inner-spherical-surface-portion molding portion
71 track-groove molding portion
72 track-chamfer molding portion
73 cup-inlet-chamfer molding portion
74 track-inlet-chamfer molding portion

The invention claimed is:

1. An outer joint member for a fixed type constant velocity universal joint, the outer joint member comprising:
   a cup section; and
   a shaft section extending in an axial direction from a bottom portion of the cup section, the shaft section having a center hole formed at an end surface thereof,
   wherein the outer joint member is made of machine-structural carbon steel including a carbon component of 0.37 wt % or more and 0.61 wt % or less,
   wherein the cup section has a radially inner surface provided with
     track grooves to which balls are fitted,
     radially inner spherical-surface portions,
     a cup-inlet chamfer formed along an entire opening periphery of the cup section,
     track chamfers formed along boundary portions between the radially inner spherical-surface portions and the track grooves, and
     track-inlet chamfers each of which includes a cutout round portion for alleviating biting of the balls and is provided at a part corresponding to a ball-contact point at an opening end of each of the track grooves,
   wherein the track grooves, the radially inner spherical-surface portions, the cup-inlet chamfer, the track chamfers, the track-inlet chamfers, a part except for a boot fixing portion on a radially outer surface of the cup section, and the center hole at the end surface of the shaft section are formed by cold-forging finishing without having finishing processes performed thereon after the cold-forging finishing, and
   wherein two of the cutout round portions for alleviating biting of the balls are provided for each of the track grooves.

2. An outer joint member for a fixed type constant velocity universal joint according to claim 1, wherein the radially inner spherical-surface portions of the cup section, after being formed by the cold-forging, undergo a finishing process after heat treatment.

3. An outer joint member for a fixed type constant velocity universal joint according to claim 2,
wherein a slit groove extending in the axial direction is formed in each of the radially inner spherical-surface portions of the cup section, and
wherein a width dimension of the slit grooves is set to range from 5% to 30% of a maximum width dimension of each of the radially inner spherical-surface portions between the track grooves adjacent to each other in a circumferential direction.

4. An outer joint member for a fixed type constant velocity universal joint according to claim 3,
wherein the track-inlet chamfers are formed at boundary portions between the track grooves and the cup-inlet chamfer, and
wherein the track grooves, the cup-inlet chamfer, the cut-out round portions, and the track chamfers are finished by simultaneous cold-forging.

5. An outer joint member for a fixed type constant velocity universal joint according to claim 2,
wherein the track-inlet chamfers are formed at boundary portions between the track grooves and the cup-inlet chamfer, and
wherein the track grooves, the cup-inlet chamfer, the cut-out round portions, and the track chamfers are finished by simultaneous cold-forging.

6. An outer joint member for a fixed type constant velocity universal joint according to claim 1,
wherein a slit groove extending in the axial direction is formed in each of the radially inner spherical-surface portions of the cup section, and
wherein a width dimension of the slit grooves is set to range from 5% to 30% of a maximum width dimension of each of the radially inner spherical-surface portions between the track grooves adjacent to each other in a circumferential direction.

7. An outer joint member for a fixed type constant velocity universal joint according to claim 6,
wherein the track-inlet chamfers are formed at boundary portions between the track grooves and the cup-inlet chamfer, and
wherein the track grooves, the cup-inlet chamfer, the cut-out round portions, and the track chamfers are finished by simultaneous cold-forging.

8. An outer joint member for a fixed type constant velocity universal joint according to claim 1,
wherein the track-inlet chamfers are formed at boundary portions between the track grooves and the cup-inlet chamfer, and
wherein the track grooves, the cup-inlet chamfer, the cut-out round portions, and the track chamfers are finished by simultaneous cold-forging.

9. An outer joint member for a fixed type constant velocity universal joint according to claim 1, wherein each of the track chamfers is formed into a convex round shape.

10. An outer joint member for a fixed type constant velocity universal joint according to claim 1,
wherein each of the track grooves has such a lateral-sectional Gothic arch shape as to be held in angular contact with one of the balls, and
wherein an angle formed by the angular contact is set to range from 35° to 45°.

11. An outer joint member for a fixed type constant velocity universal joint according to claim 1, wherein a track offset angle formed between a line connecting a curvature center of each of the track grooves and a ball center of one of the balls fitted to a corresponding one of the track grooves and a line connecting the ball center and a curvature center of a corresponding one of the radially inner spherical-surface portions is set to range from 5.5° to 7.5°.

12. An outer joint member for a fixed type constant velocity universal joint according to claim 1, wherein a curvature center of each of the track grooves is shifted in a radial direction to such a position as to have a radius larger than a radius formed at a position on a joint axis.

* * * * *